United States Patent [19]
Grove-Rasmussen

[11] Patent Number: 5,468,274
[45] Date of Patent: Nov. 21, 1995

[54] PROCESS AND APPARATUS FOR MAKING MINERAL WOOL FIBRES

[75] Inventor: Svend Grove-Rasmussen, Roskilde, Denmark

[73] Assignee: Rockwool International A/S, Denmark

[21] Appl. No.: 90,025

[22] PCT Filed: Jan. 15, 1992

[86] PCT No.: PCT/EP32/00005
§ 371 Date: Jul. 15, 1993
§ 102(e) Date: Jul. 15, 1993

[87] PCT Pub. No.: WO92/12939
PCT Pub. Date: Aug. 6, 1992

[30] Foreign Application Priority Data

Jan. 16, 1991 [GB] United Kingdom ............ 9100887

[51] Int. Cl.⁶ ............................................. C03B 37/05
[52] U.S. Cl. .................. 65/469; 65/516; 65/517; 65/455
[58] Field of Search ................. 65/6, 7, 14, 15, 65/455, 469, 516, 517

[56] References Cited

U.S. PATENT DOCUMENTS 2,520,168  8/1950  Powell .
2,520,169  8/1950  Powell .
2,807,048  9/1957  Hedges .
3,159,475  12/1964  Chen et al. .
4,119,421  10/1978  Alenrot et al. .
4,433,992  2/1984  Debouzie et al. ................. 65/15 X

FOREIGN PATENT DOCUMENTS 2356606  1/1978  France .
961900  6/1964  United Kingdom .
999119  7/1965  United Kingdom .

Primary Examiner—W. Gary Jones
Assistant Examiner—John Hoffmann
Attorney, Agent, or Firm—Brumbaugh, Graves, Donohue & Raymond

[57] ABSTRACT

The invention relates to fiberizing apparatus for forming mineral wool and a process using that apparatus. The apparatus comprises a set (1) of at least three rotors mounted for rotation about respective horizontal axes. Melt is poured onto the top rotor (4) and thrown onto subsequent rotors in turn (5, 6 and 7) with the result that fibres are thrown off. The rotors all rotate to give an acceleration field of at least 50 km/s², and are spacially arranged in respect to one another so that a line drawn from the axis of the first rotor (4) to the axis of the second rotor (5) makes an angle (C) of 0–20° below the horizontal.

25 Claims, 3 Drawing Sheets

PROCESS AND APPARATUS FOR MAKING MINERAL WOOL FIBRES

BACKGROUND OF THE INVENTION

1. Field of the Invention

It is known to make inorganic fibres from an inorganic melt using fiberising means comprising a set of rotors each mounted for rotation about a different substantially horizontal axis and arranged such that, when the rotors are rotating, melt poured onto the periphery of the top rotor in the set is thrown on to the periphery of the subsequent rotor (or onto the periphery of each subsequent rotor in sequence) in the set and inorganic fibres are thrown off the or each subsequent rotor.

This general process and apparatus can be used for different types of mineral melt. Success in the process depends critically upon the viscosity-temperature relationship and the surface tension of the melt at various stages in the process. Apparatus designed for a melt having one set of properties is wholly unsuitable for making fibres from a melt of a totally different properties.

2. Description of the Prior Art

In U.S. Pat. No. 4,238,213, Pallo describes the manufacture of ceramic fibres from such a fiberising means in which the set of rotors consists of two rotors that, in all the specific description, are described as having the same size and speed of rotation. In particular, the rotors have diameters of 150 to 300 mm and rotate at speeds of above 107 m/s and it is stated that these high speeds lead to fine average and effective fibre diameters than are obtained at lower speeds. However it is also stated that the process does lead to the presence of coarse shot in the fibre.

A particular problem with ceramic materials is that they do not melt until very high temperatures (typically around 1,800° C.) but then change from a highly viscous state (at which they are too viscous to form fibres satisfactorily) to a highly fluid state (at which their viscosity is too low to form fibres) within a range typically of around 50° C.

As a result, it is not practicable to operate such a process with more than two rotors since the melt on the third rotor would inevitably be too cool to form satisfactory fibres.

We are concerned with the production of mineral wool. Whereas aluminum silicate fibres consist of a minimum of 98% $Al_2O_3$ and $SiO_2$ and no more than 2% other oxides, the chemical composition of what we refer to herein as mineral wool is characterised by a large variety of oxides, where the sum of $Al_2O_3$ and $SiO_2$ is generally between 40 and 70%, and the rest is other common oxides from minerals, for instance CaO, MgO, $Fe_2O$, FeO, $TiO_2$ or $Na_2O$, as described in U.S. Pat. No. 2,576,312 and in Danish Patent Application DK 4923/89. The raw material for this mineral wool, is normally composed of one or more of diabase, basalt, slag, lime-stone, dolomite, cement, clay, feldspart, sand or olivin or other relatively impure, usually iron-containing materials in which event the mineral wool is referred to herein as stone wool. Another type of mineral wool is glass wool, usually made from an iron-free melt containing expesive additives such as soda and borex. Both stone wool and glass wool can be produced at a much wider temperature range—about 200° C.—typically 1,400 to 1,600° C. Because of this fundamental difference in the melting and rheology properties and the demand for high output when making mineral wool, processes and apparatus suitable for ceramic fibres are not suitable for efficient and economic production of mineral wool.

Mineral wool, however, is made from rock (including slag) at lower temperatures and typically satisfactory formation of mineral wool fibres can be achieved through a range of as much as 200° C. or more, typically 1,400 to 1,600° C. Because of this fundamental difference in the melting and rheology properties, processes and apparatus suitable for ceramic fibres are not suitable for efficient production of mineral wool fibres.

Apparatus for making mineral wool fibres from a mineral melt of, for instance, slag or other stone comprises a fiberising chamber, fiberising means in the chamber for receiving mineral melt, converting it into mineral wool fibres and air supply means for blowing the fibres axially along the chamber, and collector means comprising a conveyor in the base of the chamber for collecting the blown fibres as a web and for carrying them away from the fiberising means.

There is an air supply for carrying fibres axially from the rotors. The air supply can be arranged merely around the periphery of the set (as in U.S. Pat. No. 3,709,670) or there can be an air supply slot associated with the or each of the said subsequent rotors. The slot can be spaced away from the periphery of the rotor as in EP 59152 or can be close to it, as in GB 1,559,117.

The literature proposes various diameters and speeds for the various rotors and a typical apparatus consists of four rotors with each rotor in the series being significantly larger than, and rotating at a higher peripheral velocity than, the preceding rotor. Typically the final rotor has a diameter almost or about twice the diameter of the top rotor and rotates with a peripheral velocity that typically is three times the peripheral velocity of the top rotor.

The acceleration field that can be imparted by the final rotor is very much more than (for instance five times) the acceleration field that can be imparted by the first rotor but it is not commercially practicable to try to achieve finer diameters by increasing the speed still further because of the extreme engineering and material problems in arranging for the final rotor or rotors to travel at faster speeds. For instance increasing the peripheral velocity of a final rotor of 330 mm diameter above its typical present maximum of around 7,000 rpm leads to severe risk of shattering of the rotor, unless the rotor is made of exceedingly expensive material. It is proposed in WO/90/15032 to mount a rotor having a diameter of 300 to 400 mm on magnetic bearings so as to permit high speeds of revolution, but this still creates engineering and economic difficulties.

There are numerous disclosures in the literature of fiberising means for mineral wool comprising three or four fiberising rotors arranged in the general manner described above, and the top rotor in the set always has a smaller diameter and/or a lower peripheral velocity than all the other rotors, with the result that the acceleration force that it can impart is very much less than the acceleration force provided by each of the other rotors. For instance a typical construction of the type shown in GB 1,559,117 gives an acceleration force on the top rotor of around 15 km/s$^2$ (15000 metres per second$^2$) whereas the acceleration force provided by each of the other rotors ranges from 2 to 5 times as much.

The principle reason for this is that conventional thinking has dictated that it would be impossible to accelerate the melt by the top rotor alone sufficient to give the capacity for forming fibres on that rotor and that it should, instead, merely serve to accelerate the melt sufficiently for it to be thrown against the second rotor with sufficient force that fibres will then satisfactorily be formed on the second rotor.

Conventional thinking has also indicated that each rotor in the set should have a larger diameter and a higher peripheral velocity than each preceding rotor in the set, with the result that the most effective fibre formation is achieved off the last rotor, where the acceleration force is greatest, typically in the range 50 to 100 km/s² compared to a value of around 15 km/s² off the first rotor.

U.S. Pat. No. 2,520,168 discloses fiberising apparatus comprising rotors each of which is supported by a shaft that makes an angle to the horizontal. This document also discloses that the top rotor is driven at a slower speed than the lower rotors, as is discussed above.

Typically no particular consideration has been applied to the vertical and horizontal displacement of the rotors with respect to each other, and in particular they have been arranged relatively close to one another with their particular positions selected more for engineering convenience than for optimisation of fibre formation.

Whenever mineral wool fibres are made using such fiberising apparatus, a problem that arises is that some of the melt is thrown off the fiberising apparatus in the form of shot, that is to say coarse particles of melt. If this shot is trapped in the mineral wool, it reduces the properties of the wool. If, alternatively, it is collected from the base of the chamber it has to be recycled and this reduces the overall efficiency of the process. It would be desirable to reduce the formation of shot during the manufacture of mineral wool by a fiberising apparatus that consists of at least three of the described rotors.

SUMMARY OF THE INVENTION

Fiberising apparatus according to the invention for forming mineral wool comprises a set of at least three rotors each mounted for rotation about a different horizontal axis and arranged such that, when the rotors are rotating, melt poured onto the periphery of the top rotor in the set is thrown onto the periphery of the second rotor and then onto the periphery of the third rotor and fibres are thrown off the rotors, characterised in that the top rotor is provided with driving means and has a size such that it can rotate to give an acceleration field of above 50 km/s² and the second and third rotors are each provided with driving means and have a size such that each can give a greater acceleration field than the top rotor, and the axes of the first and second rotors are arranged such that a line drawn from the axis of the first rotor to the axis of the second rotor makes an angle of from 0 to 20°, preferably 5 to 10°, below the horizontal.

The fiberising means comprises a set of rotors as described generally above, but in contrast the fiberising means for ceramic fibres, when making mineral wool fibres there are normally three or four rotors in the set. The advantages of having at least three rotors rather than two is that a much higher grade wool is formed which in addition has a much reduced amount of coarse shot.

Preferably, each rotor in the set is provided with driving means and has a size such that it can give greater acceleration field than the preceding rotor in the set.

The invention also includes apparatus comprising a fiberising chamber, the set of rotors, air supply means for blowing the fibres along the chamber and collector means for collecting the blown fibres and carrying them away and comprising at least one conveyor in the base of the chamber.

The invention also includes a process of making mineral wool wherein stone or other mineral melt having a temperature in the range 1300° C. to 1700° C., often 1400 to 1600° C. preferably 1500 to 1550° C. is poured on to the top rotor in such apparatus and this rotor provides an acceleration field of at least 50 km/s².

The acceleration field, or the centripetal acceleration, of a rotor is the field G where $G = r\Omega^2$ where r is the radius of the rotor and $\Omega$ is the angular velocity of the rotor where $$\Omega = \frac{2\pi n}{60}$$

where n is the revolutions per minute.

We have surprisingly found that it is possible to achieve useful results with an acceleration force on the top rotor that is very much greater than the force on the first rotor of conventional 3 or 4 rotor apparatus for forming mineral wool fibres and that when we do this we reduce the amount of shot that is formed in the process. It seems that, contrary to what might have been predicted, the increased acceleration field on the first rotor does result in a very useful increase in the acceleration on the melt by the first rotor. This improves distribution on to the second and subsequent rotors and it reduces shot formation, and improves overall fibre formation. Some useful formation of fibres may occur on the top rotor.

Whereas the ratio of diameters between the top rotor and the last rotor in the set in prior apparatus typically approaches or exceeds 2:1, in the invention the ratio is preferably from 1.1:1 to 1.5:1, often around 1.3:1. For instance the first rotor typically has a diameter of 100 to 300 mm, often around 200 to 250 mm. The final rotor may have a diameter of 130 to 350 mm often around 250 to 300 mm. The ratio of the diameters of the top rotor to the second rotor typically is from 1.1:1 to 1.5:1 and from the second to the third rotors typically is from 1:1 to 1.3:1, preferably around 1:1. In particular, it is often preferred that the second, third and any subsequent rotors should have substantially the same diameter.

The ratio of the rotation speed (in revolutions per minute) of the final rotor in the set to the first rotor is typically in the range 1.1:1 to 1.7:1, often around 1.4:1, and this is in contrast to a typical ratio of around 2:1 for previous arrangements. The speed of the first rotor generally is above 5,000 rpm, typically in the range 7,000 to 15,000 rpm. The speed of the final rotor may be in the range 10,000 to 15,000 rpm. The ratio of the speed of each rotor to the speed of the preceding rotor in the series is generally in the range 1:1 to 1.5:1, usually 1.1:1 to 1.3:1 although it can be desirable for the top and second rotors to have substantially the same speed.

The ratio of the peripheral velocity of the second rotor to the peripheral velocity of the top rotor is generally from 1.1:1 to 1.8:1, often around 1.1:1 to 1.5:1 and the ratio of the peripheral velocity of each subsequent rotor to the peripheral velocity of the preceding rotor is often 1.1:1 to 1.5:1, generally around 1.1:1 to 1.3:1.

The acceleration field (in thousand metres per second squared) is the most important parameter and, in the invention, very high acceleration fields can be obtained by having very fast rotating, relatively small, rotors. The ratio of the acceleration field of the last rotor in the set to the first rotor is generally from 2:1 to 4:1, often around 2.2:1 to 3:1. The acceleration field provided by the top rotor is preferably at least 50 km/s². It can be up to around 150 km/s², or even greater in some circumstances, but is generally below 100 km/s².

The ratio of the acceleration field of the second rotor to the first rotor is generally from 1.1:1 to 2:1, preferably around 1.2:1 to 1.7:1 and the ratio of the acceleration field on each subsequent rotor to the preceding rotor is generally 1.2:1 to 1.6:1. The acceleration field provided by the final rotor typically is from 150 km/s² to 300 km/s², or even greater in some instances.

One particular embodiment of the present invention has a set of small rotors as compared to the prior art, with all rotors having diameters of less than 250 mm. In this particular embodiment, it is preferred that each rotor can provide an acceleration field of at least 250 km/s².

The axis of the second rotor is positioned such that a line drawn from the axis of the first rotor to the axis of the second rotor makes an angle of from 0 to 20°, preferably 5 to 10°, below the horizontal. This is particularly suitable when, as is preferred, the melt strikes the first rotor at a position that makes an angle of from 40 to 65°, preferably 45 to 60°, above that horizontal. Thus the melt travels through an angular distance generally of 45 to 80°, preferably 50 to 70°, from the point at which it strikes the top rotor to the line joining the axes of the top and second rotors.

The second, third and fourth rotors, and optionally also the first rotor, should each have an air slot associated with it wherein the internal diameter of the slot is substantially the same as the external diameter of the periphery of the rotor, so as to permit air to be blown over part at least of the periphery of those rotors as a wall jet, as described in GB 1,559,117. Preferably the slot directs the air blast parallel to the surface and the diameter of the slot is preferably the same as the diameter of the periphery of its associated rotor. However it can be a few millimetres more and/or the air stream may emerge with a slight conical angle provided that a wall jet is formed over the surface of the associated rotor. Whether or not a wall jet is occurring can easily be established by identifying the velocity profile adjacent to the surface. When a wall jet exists, the greatest velocity is close (e.g., within 10 mm) to the surface both at the rear edge of the rotor and at the front edge of the rotor.

The air that provides the wall jet may emerge from the slot solely in an axial direction or may emerge with tangential and axial velocity components. For instance the air can have a tangential velocity up to 30% or 50% or more of the peripheral velocity. It can have a tangential velocity of up to 50 m/s, preferably 80 to 100 m/s. The linear velocity is generally 100 to 300, often 100 to 200, metres per second.

The air slot can consist of inner and outer slots, wherein the inner slot provides an inner blast of air that is sufficiently close to the surface to form a wall jet and the outer slot provides an outer blast of air that merges with the inner blast so as to give a wall jet effect to the combined blasts. Generally the inner surface of the outer slot is not more than 20 or 30 mm radially from the surface of the rotor and generally it is within 10 mm. Preferably the inner and outer blasts have different angles of travel at the time of exiting from their slots. For instance the inner bast can be wholly axial and the outer slot can contain direction means to cause the outer blast to have the desired tangential component.

The direction means can be in the form of guides in the slot associated with the final rotor in the set (and often in all the slots) and are arranged to direct the air at an angle to the axial direction that varies along the length of the slot between a higher angle that is corotational with the rotor and a lower angle.

Thus the air stream will emerge from the slot at different angles along the length of the slot.

It is desirable that there should not be a sudden transition from the higher angle to the lower angle and so preferably there is a graduated transition. Usually most of the slot is at one angle and the remainder of the slot, usually at one end, is at the other angle, but if desired the angle may, for instance, start at the lower angle, increase to the higher angle and then reduce to the lower angle.

The slot is preferably an annular or part annular duct that extends around the associated rotor, alternatively it can be a series of adjacent orifices.

Additional air can be provided from secondary air supplies for carrying the fibres away from the rotors, and binder can be sprayed from sprays that are coaxial with the rotors or are arranged in the chamber around the rotors.

In order to increase plant productivity a number of fiberising means have been combined. However, the fiberising means of the prior art have been combined to give a mirror-image arrangement of the separate sets of rotors necessary; this has the disadvantage that the mineral wool manufacturer must stock two different sets of rotors to provide for replacement of either of the sets when it becomes necessary.

According to the present invention apparatus for fiberising mineral wool is provided comprising at least two fiberising means wherein each set of rotors is identical and is as defined above.

This represents a further advantage of the present invention over the prior art.

The mineral that is used for forming the fibres in the invention can be any of the minerals conventionally used for forming mineral wool as herein defined. Preferably the product is a stone wool made from for instance rock, slag, diabase or basalt. Although the invention can be applied to the production of glass wool, preferably it is used for stone wool. Such material is distinguished from material used for making ceramic fibres or glass fibres by the relationship between its melting point and viscosity, as is well known in the art. It should have a melting range throughout which fibres can be formed of above 80° C., often 100 to 200° C. and typically melts at above 1400° C. but below 1700° C.

A particular advantage of the present invention is the very low content of coarse shot in the resulting wool as compared to prior art processes.

BRIEF DESCRIPTION OF THE DRAWINGS

The invention is illustrated by reference to the accompanying drawings in which.

DESCRIPTION OF THE PREFERRED EMBODIMENTS

Figure 1:
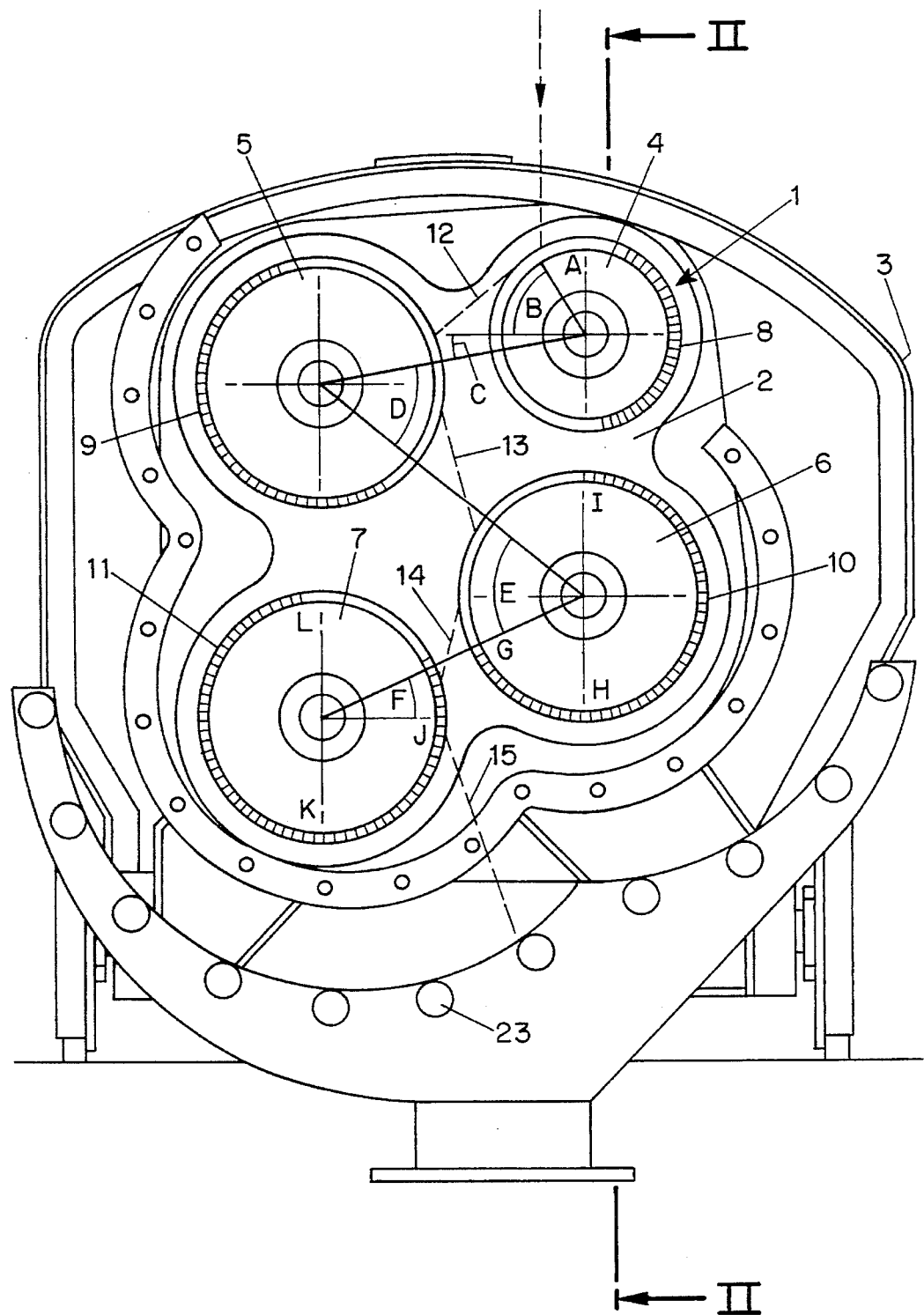
FIG. 1 is a front view of a set of rotors assembled for use in apparatus according to the invention.

The apparatus includes a set 1 of rotors each mounted on the front face 2 of a housing 3. The set is positioned at one end of a chamber to receive melt from a melt furnace. Each rotor is mounted in conventional manner on a driven axle that allows it to be rotated at high peripheral speed. The set consists of four rotors, a top rotor 4 that rotates anti-clockwise, a second fiberising rotor 5 that rotates clockwise, a third fiberising rotor 6 that rotates anti-clockwise, and a fourth fiberising rotor 7 that rotates clockwise. The bearings and drive mechanisms are not shown. Air slots 8, 9, 10 and 11 are associated with, respectively, the rotors 4, 5, 6 and 7, each slot extending around part only of the rotor. Generally each slot extends around at least ⅓ of the periphery of its associated rotor, generally around the outer part of the set of rotors. Generally it extends around not more than ⅔ or ¾ of the periphery.

Each slot leads from an air supply chamber within the housing.

Molten mineral melt is poured on to the rotor 4 along the path illustrated and strikes the top rotor 4 at point A that is at a position such that the angle B (i.e., the angle that A makes with the horizontal towards the second rotor) is from 40 to 65° to the horizontal, often around 45 to 60° to the horizontal. The second fiberising rotor 5 should be positioned at or only slightly below the first rotor and so the angle C typically is from 0° to 20°, often around 5 to 10°.

By this means, it is possible to ensure that melt that is thrown off the first rotor on to the second rotor impacts on the peripheral surface of the second rotor substantially at right angles (e.g., from 75 to 105° to the normal). Similarly, it is preferred that the sum of angles D, E and F should be as low as possible. F is the included angle between the horizontal and the line joining the axes of the third and fourth rotors, E is the included angle between the lines joining the axes of the third and fourth rotors and the second and third rotors, while D is the included angle between lines joining the axes of the first and second rotors with the axes of the second and third rotors. Preferably C+D+E+F is below 150° but should generally be above 120°, and most preferably it is in the range 125 to 142°, with best results being obtained at around 135 to 140°.

Some of the melt striking the top rotor 4 at A is thrown off the rotor 4 as fibres but some is thrown on to subsequent rotor 5. Some of the melt is fiberised off that rotor whilst the remainder is thrown along path 13 on to subsequent rotor 6. A significant amount of this is fiberised off rotor 6, mainly in the area where there is slot 9, but some is thrown along path 14 on to the subsequent rotor 7. A significant amount is fiberised in the general direction 15 but a large amount is also fiberised around the remainder of the rotor surface included within slot 10.

Since the slots 8, 9, 10 and 11 do not extend around the entire periphery of each rotor, the air flow in the region of paths 12, 13 and 14 can be controlled and, indeed, can be substantially zero.

In a preferred apparatus, the top rotor 4 has a diameter of about 210 mm and rotates at about 8,000 rpm giving an acceleration force of about 74,000 m/s². This compares with values for conventional apparatus in accordance with GB 1,559,117 which may be, typically, around 180 mm, 3,900 rpm and 15,000 m/s² respectively.

The second rotor (rotor 5) may have a diameter of about 280 mm and may rotate at the same speed 8,000 rpm or more, giving an acceleration force of around 98,000 m/s² (compared to values for a typical apparatus in GB 1,559,117 of around 230 mm, 5,500 rpm and 39,000 m/s² respectively.

The third rotor (6) may have the same diameter 280 mm and may rotate at 9,000 rpm to give an acceleration force of around 124,000 m/s² compared to typical values of 314 mm, 6,600 rpm and 75,000 m/s² for typical apparatus according to GB 1,559,117.

The final rotor (7) may again have a diameter of around 280 mm and may rotate at 11,000 rpm, giving an acceleration force of around 186,000, compared to values of 330 mm, 7,000 rpm and about 89,000 m/s² for typical apparatus according to GB 1,559,117.

The air emerging through the slots preferably has a linear velocity, in the described example, of about 100–200 m/s. This air flow may have axial and tangential components, according to the arrangement of blades 25 within the slots.

Within each slot blades 25 can be mounted at an angle, relative to the axial direction of the associated rotor, that can be predetermined at a value ranging, typically, from zero to 42°. For instance, in slot 10 the angle in the region G to H can increase from 0° at G to about 20° at H and then the angle of the blades in the region H to I can be substantially uniform at 42°. Similarly, in slot 10 the angle can increase from about zero at J up to about 20° at K and can then increase and be substantially uniform throughout the region K to L at an angle of about 42°.

In slot 8, it may be preferred to have a lesser angle, typically a uniform angle of around 15 to 30° often around 20 or 25°.

The inner edge 24 of each slot is preferably coaxial with the associated rotor and preferably has a diameter that is substantially the same as the associated rotor.

Binder sprays 18 can be mounted as a central nozzle on the front face of each rotor and eject binder into the fibres that are blown off the rotor. Instead of or in addition to this, separate binder sprays may be provided, for instance beneath or above the set of rotors and directed substantially axially.

The fiberising chamber comprises a pit 20 having a double screw 21 that collects pearls and other fibre that drops into the pit and recycles them to the furnace. A conveyor 22 collects the fibres and carries them away from the spinners. Air is forced through a secondary air ring, for instance a plurality of orifices 23 arranged around the front face of the housing 2 and/or in and/or beneath the front face of the housing 2. The secondary air ring provides an air stream to promote the axial transport of the fibres away from the rotors and to control their rate of settlement and the intermixing with binder.

Figure 3:
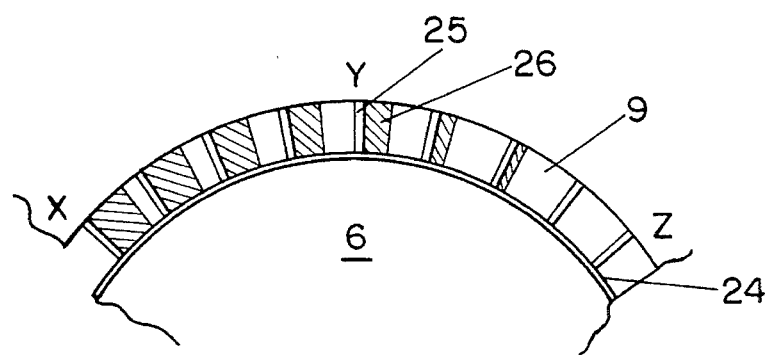
FIG. 3 is a detail of the slot around one of the rotors.

It will be seen from FIG. 3 that the inner edge 24 of the annular slot has substantially the same diameter as the outer edge of the periphery of rotor 6 and that the blades 25 are arranged substantially radially across the slot. Of course, if desired, they may be arranged at an angle. The leading edge of the blades is shown as 25, and the side face the blades is shown as 26. In FIG. 3, position X corresponds approximately to position I in FIG. 1, i.e., where the blades are arranged at about 42°, position Y corresponds to position H, i.e., where the blades are arranged at around 20°, and position G corresponds to position Z, i.e., where the blades are at 0° and thus promote truly axial flow of the air.

Figure 2:
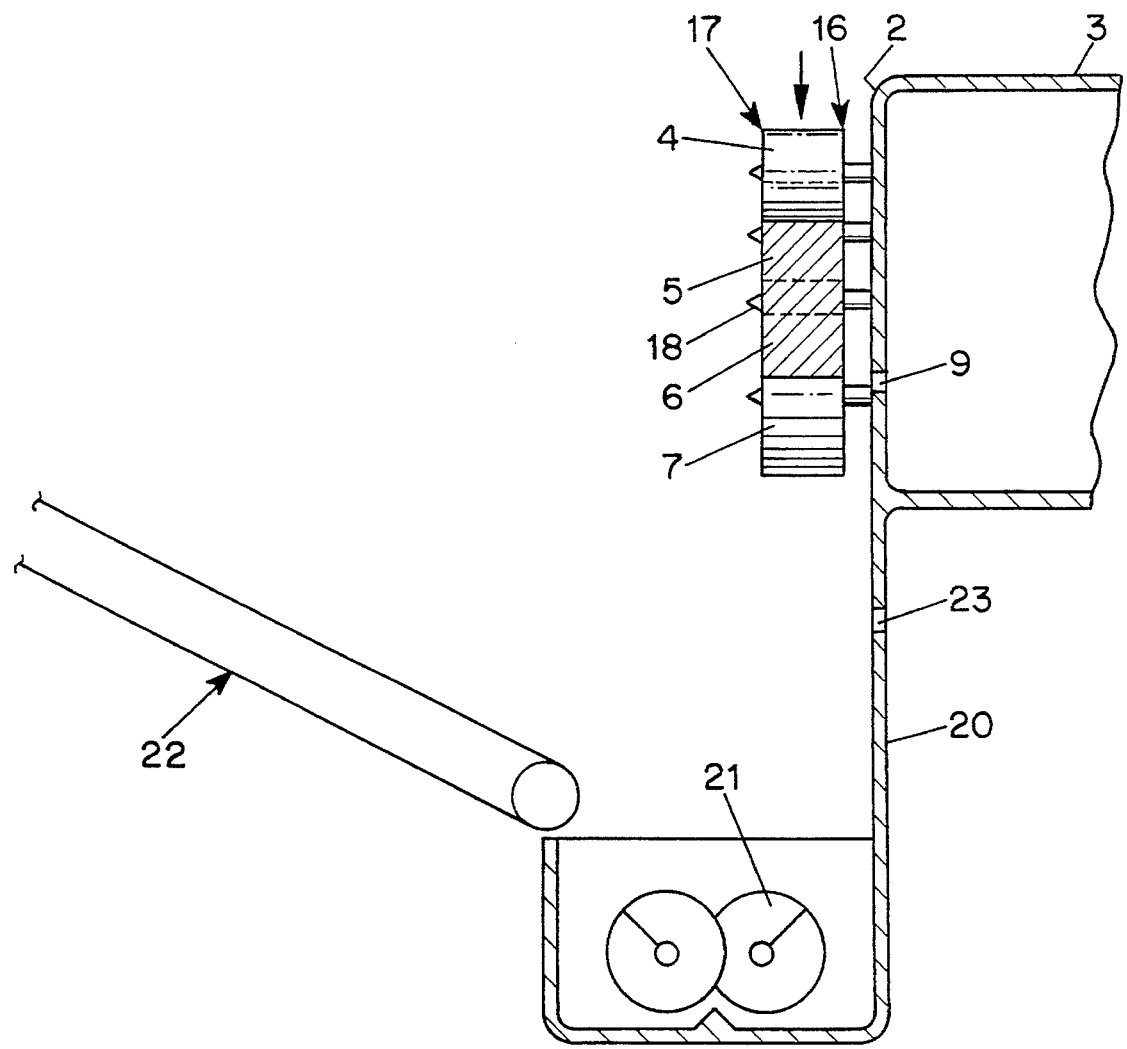
FIG. 2 is a cross-section on the line II—II through the set of rotors in FIG. 1 and through the collecting chamber in which they are positioned in use.

Although only a single air inlet 23 is illustrated in FIG. 2, preferably there can be a plurality of individually mounted air slots that are mounted beneath the rotors and that direct air in a generally forward direction. Some or all of them are pivotally mounted so that they can be relatively horizontal or relatively vertical or otherwise inclined. Also they can have blades that control the direction of air from the slot. Also, the blades can be mounted for reciprocating motion in order that they can be reciprocated during use so as to provide a pulsating air stream. Generally the slots point upwards so as to direct air upwardly and forwardly. By appropriate choice of air streams, and their movement if any, it is possible to optimise fibre collection, binder distribution, and the properties of the final product since this leads to the formation of a wall jet when the air emerges from the slot parallel to the periphery.

Although it is convenient to supply the air through true slots, a similar effect can be achieved by other means of providing a continuous curtain of air over the rotor surface, for instance a series of adjacent blast nozzles arranged around the wall rotor in the position shown in the drawings for the slots, and that will lead to the formation of a wall jet.

Figure 4:
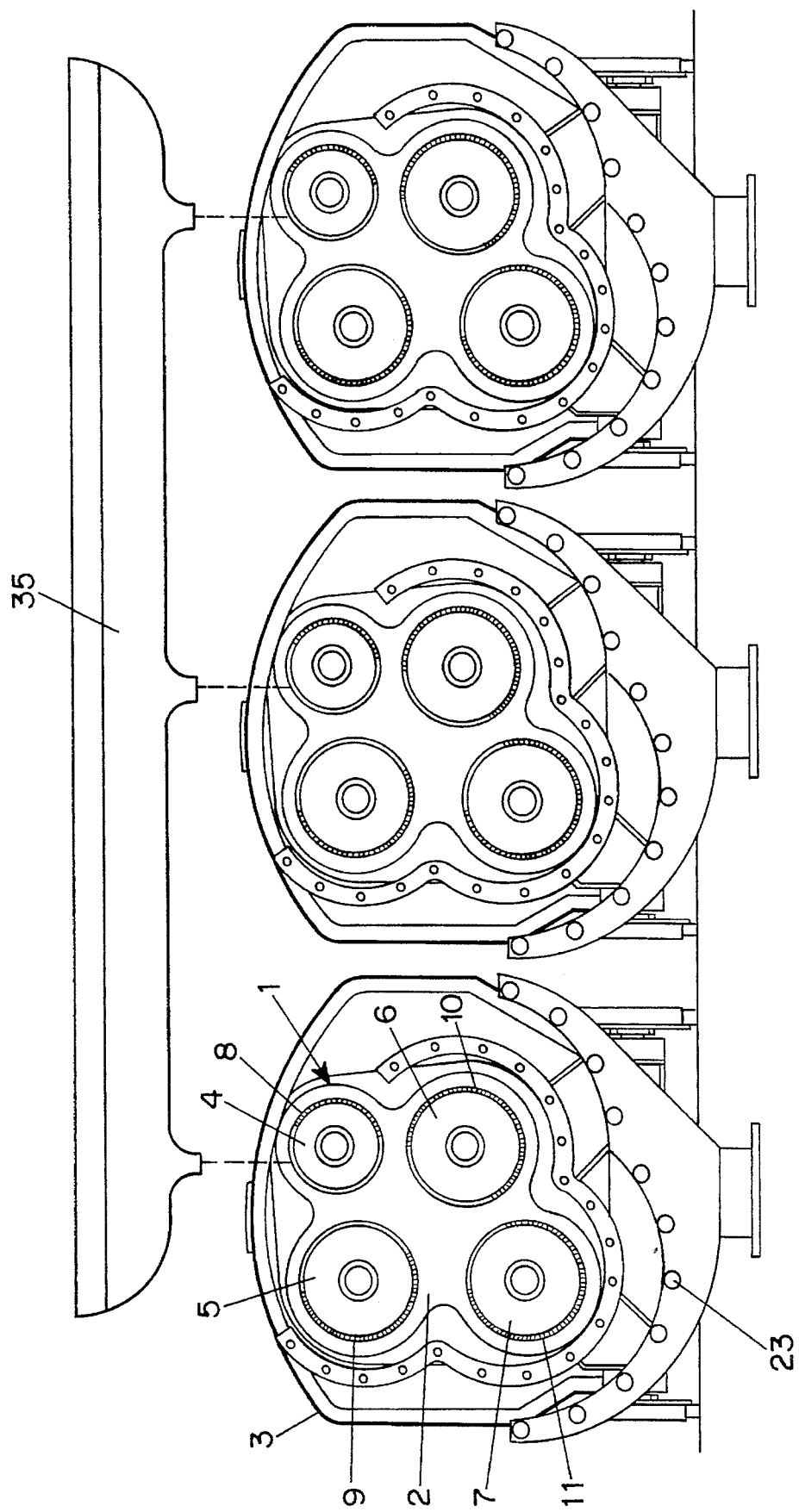
FIG. 4 is a front view of a number of fiberising means.

In FIG. 4, the reference numbers indicate the same features of the apparatus as in FIGS. 1 to 3. Separate air chambers 35 are provided for each set of rotors and lead from the melt furnace.

The invention leads to improved fiberisation of the melt, and in particular the amount of shot greater than 63 μm in the final mineral wool is reduced in the invention compared to the amount typically present when a conventional, small, top rotor is used. The amount of large shot (above 250 μm) is decreased. The length based average diameter of the fibres can be reduced.

The following is an example: 5 t/h melt is poured on the top rotor 4 of a four-wheel spinner according to a preferred apparatus of the present invention, and the following results are achieved compared to normal wool made using known apparatus, e.g. as described in GB1559117.

| Results from apparatus according to the present invention | | | |
|---|---|---|---|
| Rotor | rpm | V periphery rotor | V air slot |
| 4 | 8000 | 88 m/sec | 80–140 m/sec |
| 5 | 8000 | 177 m/sec | |
| 6 | 9000 | 131 m/sec | |
| 7 | 11000 | 161 m/sec | |

Angle C between rotors 4 and 5: 9°

Melt amount: 5 t/h

Yield of wool: 87%

Amount of shots in the wool>250 μm: 2–3%

Content of fibres>5 μm: 10%

λ at 35 kg/m$^3$: 33.5 mW/m°K

| Results from known apparatus | | | |
|---|---|---|---|
| Rotor | rpm | V periphery rotor | V air slot |
| 4 | 3800 | 38 m/sec | 80–140 m/sec |
| 5 | 5500 | 120 m/sec | |
| 6 | 6600 | 108 m/sec | |
| 7 | 7000 | 122 m/sec | |

Angle C between rotors 4 and 5: 26°

Melt amount: 5 t/h

Yield of wool: 87%

Content of fibres>5 mm: 25%

Amount of shots in the wool>250 μm: 3–5%

λ at 35 kg/m$^3$: 34.5 mW/m°K

V periphery rotor=velocity of periphery of rotor

V air slot=linear velocity of air emerging from the slot

λ=thermal conductivity at a given density (35 kg/m$^3$) The shot content is measured according to DIN standard No. 4188. The content of coarse fibre is measured with the help of a standard accumulated length-based method using a light microscope or an electron scanning microscope. Average fibre diameter is also measured based on a standard accumulated length-based on method representing a 50% fractile.

The results show that the apparatus according to the present invention provides a wool with a lower coarse shots content and a higher proportion of finer fibres than normal wool. These improved properties result in a further advantage in that the wool of the present invention has a lower thermal conductivity than normal wool at a given density.

I claim:

1. Fiberizing apparatus for forming mineral wool comprising a set of at least four rotors each mounted for rotation about a different substantially horizontal axis and arranged such that when the rotors are rotating, melt poured on to the periphery of the top rotor in the set is thrown on to the periphery of the subsequent rotors in turn while at the same time fibres are thrown off the rotors, wherein the top rotor is provided with driving means and has a size such that it rotates to give an acceleration field of at least 50 km/s$^2$ and the second and third rotors each have driving means and a size such that it rotates to give a greater acceleration field than the top rotor, and the axes of the top and second rotors are arranged such that the shortest straight line drawn from the axis of the top rotor to the axis of the second rotor makes an angle of from 0 to 20° below the horizontal, and wherein F is the included angle between the horizontal and the shortest straight line joining the axes of the third and fourth rotors, E is the included angle between the lines joining the axes of the third and fourth rotors and the second and third rotors, while D is the included angle between shortest straight lines joining the axes of the first and second rotors with the axes of the second and third rotors; angle C is the included angle between the shortest straight line joining the first and second rotors and the horizontal, and angle B is the included angle between the shortest straight line joining the axis of the first rotor and the point on the surface of the first rotor at which the mineral melt strikes the first rotor and the horizontal toward the second rotor; and wherein angle B is from 40 to 65° and the sum of C, D, E and F is from 120 to 150°.

2. Apparatus according to claim 1 in which there are four rotors in the set.

3. Apparatus according to claim 1 or claim 2 in which the ratio of the diameter of the last rotor in the set to the first rotor is from 1.1:1 to 1.5:1.

4. Apparatus according to claim 1 further comprising, an air supply slot extending around and close to each of the at least four said rotors for discharging an air blast close to and substantially parallel to the periphery of the rotor with an axial component for carrying the mineral wool fibres axially off that periphery, and direction means for selecting the angle of the discharged air relative to the axis of rotation of each of the at least four rotors, wherein the direction means is in the slot extending around a final rotor of said at least four rotors in the set and is arranged to direct the air blast at an angle to the axial direction that varies along the length of the air supply slot between a higher angle that is corotational with the final rotor and a lower angle.

5. Apparatus according to claim 1, wherein the angle is from 5 to 10°.

6. Apparatus according to claim 1 wherein the sum of C, D, E and F is from 125 to 142°.

7. Apparatus according to claim 1 wherein the sum of C, D, E and F is from 125 to 142°.

8. A process for making mineral wool using apparatus comprising a set of at least three rotors each mounted for rotation about a different substantially horizontal axis and arranged such that when the rotors are rotating melt poured on the periphery of the top rotor in the set is thrown on to the periphery of the subsequent rotors in turn and fibres are thrown off the rotors, wherein the process comprises pouring mineral melt having a temperature of from 1300 to 1700° C. on the top rotor and collected as wool the fibres that are formed and further comprising sizing and rotating the top rotor so as to impart to said rotor an acceleration field of at least 50 km/s$^2$, sizing and rotating the second and third rotors so as to impart an acceleration field to said rotors greater than the acceleration field of the top rotor, and arranging the axes of the first and second rotors such that a line drawn from the axis of the first rotor to the axis of the second rotor makes an angle of from 0 to 20° below the horizontal.

9. A process according to claim 8 in which the top rotor has a size and is rotated at a speed such that it gives an acceleration field of from 50 to 150 km/s$^2$.

10. A process according to claim 8 or 9 in which the last rotor in the set has a size and is rotated at a speed such that it gives an acceleration force that is from 2 to 4 times the acceleration force of the top rotor.

11. A process according to claim 7 in which there are four rotors in the set.

12. A process according to any of claim 11 in which the ratio of the diameter of the last rotor in the set to the first rotor is from 1.1:1 to 1.5:1.

13. A process according to claim 8 wherein said angle is from 5 to 10°.

14. Fiberizing apparatus for forming mineral wool comprising a set of at least three rotors comprising a top rotor and at least two subsequent rotors, each mounted for rotation about a different substantially horizontal axis and arranged such that when the rotors are rotating, melt poured on to the periphery of the top rotor in the set is thrown on to the periphery of the subsequent rotors in turn and fibres are thrown off the rotors, wherein the top rotor is provided with driving means and has a size such that in operation it rotates to give an acceleration field of at least 50 km/s$^2$ and the second and third rotors each have a size such that in operation they each rotate such as to give a greater acceleration field than the top rotor, and the axes of the top and second rotors are arranged such that the shortest straight line drawn from the axis of the top rotor to the axis of the second rotor makes an angle of from 0 to 20° below the horizontal, and wherein the top rotor has a diameter of 120 mm to 250 mm, and the final rotor has a greater diameter of 130 to 350 mm.

15. Apparatus according to claim 14, in which the ratio of the diameter of the last rotor in the set to the first rotor is 1.1:1 to 1.5:1.

16. Apparatus according to claim 14 further comprising at least a fourth rotor and wherein F is the included angle between the horizontal and the shortest straight line joining the axes of the third and fourth rotors, E is the included angle between the shortest straight lines joining the axes of the third and fourth rotors and the second and third rotors, while D is the included angle between the shortest straight lines joining the axes of the first and second rotors with the axes of the second and third rotors; angle C is the included angle between the shortest straight line joining the first and second rotors and the horizontal, and angle B is the included angle between the shortest straight line joining the axis of the first rotor and the point on the surface of the first rotor at which the mineral melt strikes the first rotor and the horizontal toward the second rotor; and wherein angle B is from 40 to 65° and the sum of C, D, E and F is from 120 to 150°.

17. Apparatus according to claim 14, wherein said angle is from 5 to 10°.

18. Fiberizing apparatus for forming mineral wool comprising a set of at least three rotors comprising a top rotor and at least two subsequent rotors, each mounted for rotation about a different substantially horizontal axis and arranged such that when the rotors are rotating, melt poured on to the periphery of the top rotor in the set is thrown on to the periphery of the subsequent rotors in turn and fibres are thrown off the rotors, wherein the top rotor is provided with driving means and has a size such that in operation it rotates to give an acceleration field of at least 50 km/s$^2$ and the second and third rotors each have a size such that in operation they each rotate such as to give a greater acceleration field than the top rotor, and the axes of the top and second rotors are arranged such that the shortest straight line drawn from the axis of the top rotor to the axis of the second rotor makes an angle of from 0 to 20° below the horizontal, and in which an air supply slot is associated with each of the said subsequent rotors wherein each said slot has an internal diameter substantially the same as the external diameter of the rotor with which it is associated.

19. Apparatus according to claim 18, in which ratio of the diameter of the last rotor in the set to the first rotor is 1.1:1 to 1.5:1.

20. Apparatus according to claim 18 further comprising at least a fourth rotor and wherein F is the included angle between the horizontal and the shortest straight line joining the axes of the third and fourth rotors, E is the included angle between the shortest straight lines joining the axes of the third and fourth rotors and the second and third rotors, while D is the included angle between the shortest straight lines joining the axes of the first and second rotors with the axes of the second and third rotors; angle C is the included angle between the shortest straight line joining the first and second rotors and the horizontal, and angle B is the included angle between the shortest straight line joining the axis of the first rotor and the point on the surface of the first rotor at which the mineral melt strikes the first rotor and the horizontal toward the second rotor; and wherein angle B is from 40 to 65° and the sum of C, D, E and F is from 120 to 150°.

21. Apparatus according to claim 18, wherein said angle is from 5 to 10°.

22. Fiberizing apparatus for forming mineral wool comprising a set of at least three rotors comprising a top rotor and at least two subsequent rotors, each mounted for rotation about a different substantially horizontal axis and arranged such that when the rotors are rotating, melt poured on to the periphery of the top rotor in the set is thrown on to the periphery of the subsequent rotors in turn and fibres are thrown off the rotors, wherein the top rotor is provided with driving means and has a size such that in operation it rotates to give an acceleration field of at least 50 km/s$^2$ and the second and third rotors each have a size such that in operation they each rotate such as to give a greater acceleration field than the top rotor, and the axes of the top and second rotors are arranged such that the shortest straight line drawn from the axis of the top rotor to the axis of the second rotor makes an angle of from 0 to 20° below the horizontal, including also a fiberizing chamber and collector means comprising a conveyor in the base of the chamber for collecting the blown fibres as a web and for carrying them away from the set of rotors.

23. Apparatus according to claim 22, wherein said angle is from 5 to 10°.

24. A process for making mineral wool using apparatus comprising a set of at least three rotors comprising a top rotor and at least two subsequent rotors each mounted for rotation about a different substantially horizontal axis and arranged such that when the rotors are rotating, melt poured on the periphery of the top rotor in the set is thrown on to the periphery of the subsequent rotors in turn and fibres are thrown off the rotors, wherein the process comprises pouring mineral melt having a temperature of from 1300 to 1700° C. on the top rotor and collected as wool the fibres that are formed and further comprising sizing and rotating the top rotor so as to impart to said rotor an acceleration field of at least 50 km/s$^2$, sizing and rotating the second and third rotors so as to impart an acceleration field to said rotors greater than the acceleration field of the top rotor, and arranging the axes of the top and second rotors such that the shortest straight line drawn from the axis of the top rotor to the axis of the second rotor makes an angle of from 0 to 20° below the horizontal, and wherein the top rotor has a diameter of 120 to 250 mm and the final rotor of the at least three rotors has a greater diameter of 130 to 350 mm.

25. A process for making mineral wool using apparatus comprising a set of at least three rotors comprising a top rotor and at least two subsequent rotors each mounted for rotation about a different substantially horizontal axis and arranged such that when the rotors are rotating, melt poured on the periphery of the top rotor in the set is thrown on to the periphery of the subsequent rotors in turn and fibres are thrown off the rotors, wherein the process comprises pouring mineral melt having a temperature of from 1300 to 1700° C. on the top rotor and collected as wool the fibres that are formed and further comprising sizing and rotating the top rotor so as to impart to said rotor an acceleration field of at least 50 km/s$^2$ sizing and rotating the second and third rotors so as to impart an acceleration field to said rotors greater than the acceleration field of the top rotor, and arranging the axes of the top and second rotors such that the shortest straight line drawn from the axis of the top rotor to the axis of the second rotor makes an angle of from 0 to 20° below the horizontal, and further comprising an air supply slot extending around and close to each of the said subsequent rotors for discharging an air blast close to and substantially parallel to the periphery of the rotor with an axial component for carrying the mineral wool fibres axially off that periphery and wherein each said slot has an internal diameter substantially the same as the external diameter of the rotor with which it is associated.

* * * * *